Feb. 18, 1964 C. KARATZAS 3,121,332
PRESSURE TRANSDUCER
Filed June 20, 1961 2 Sheets-Sheet 1

INVENTOR
CHARLES KARATZAS
BY
ATTORNEYS

Feb. 18, 1964   C. KARATZAS   3,121,332
PRESSURE TRANSDUCER
Filed June 20, 1961   2 Sheets-Sheet 2
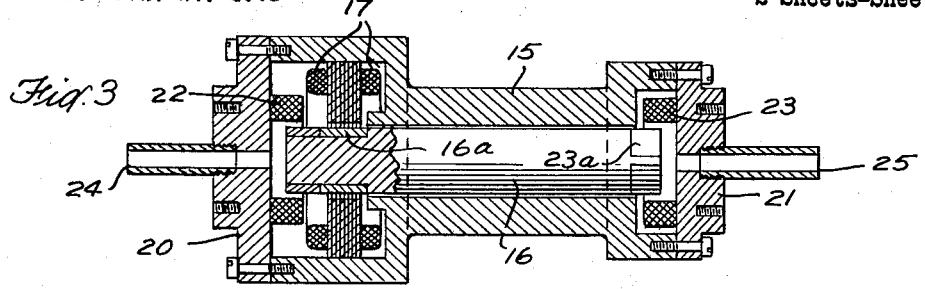
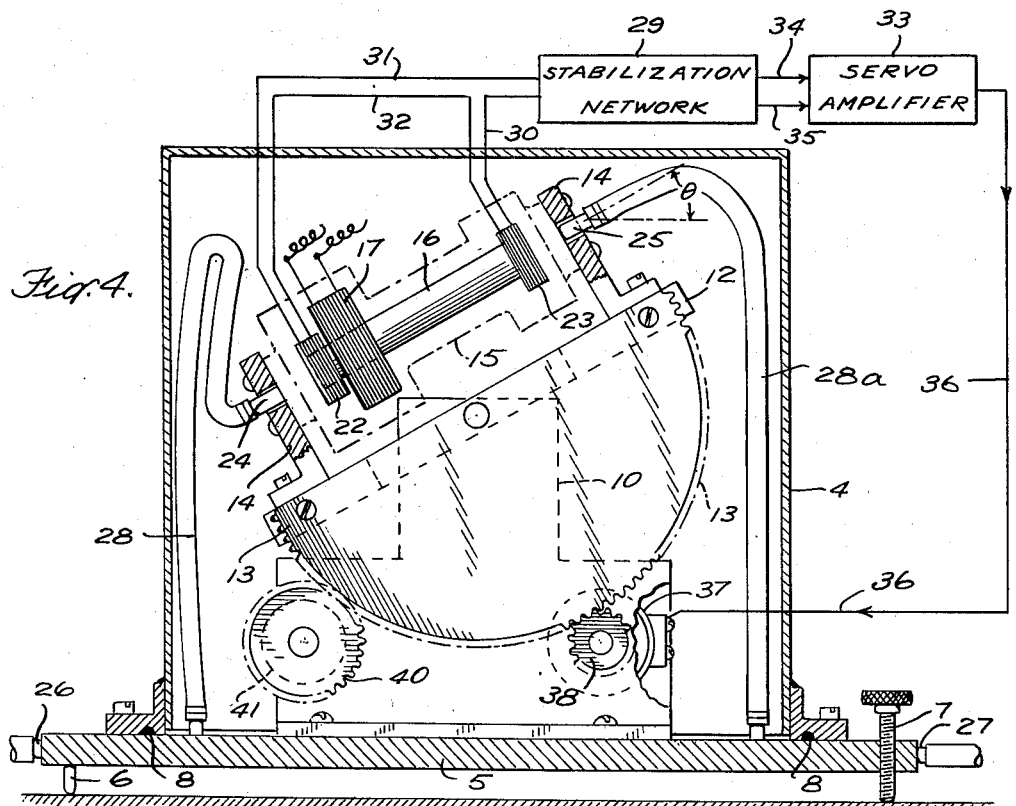
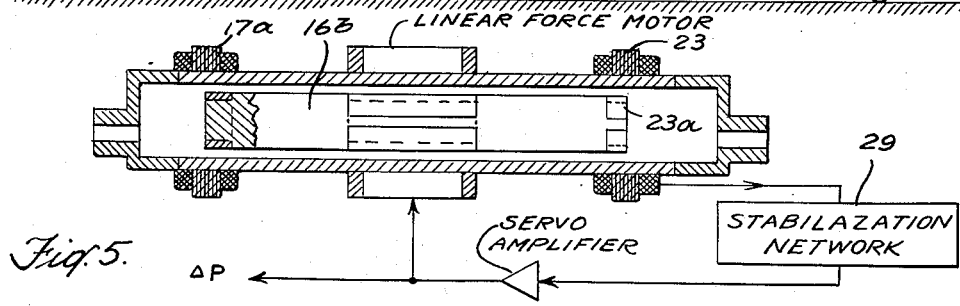

United States Patent Office 3,121,332
Patented Feb. 18, 1964

3,121,332
PRESSURE TRANSDUCER
Charles Karatzas, Syosset, N.Y., assignor to Sperry Rand Corporation, Ford Instrument Co. Div., Long Island City, N.Y., a corporation of Delaware
Filed June 20, 1961, Ser. No. 118,408
4 Claims. (Cl. 73—398)

This application relates to instruments for measuring pressure and for indicating same. The device which is the subject of this invention is a transducer which employs electrical components in a circuit to respond to gas pressure in such a manner as to afford highly precise measurement and indication of the pressure.

In general, the transducer employs a hydrodynamically supported body tiltable on a fixed axis transverse of its housing and axially translatable in response to pressure. There is provided a servo network for detecting the body's translation and generating a signal for causing it to assume an angle of tilt which corresponds to the degree of translation. An angle resolver or transducer is associated with the body's supporting mechanism for measuring the tilt angle and, as explained below, thereby affording an indication of the pressure exerted on the body by the gas pressure.

One object of the invention is to provide a highly precise pressure transducer.

Figure 1:
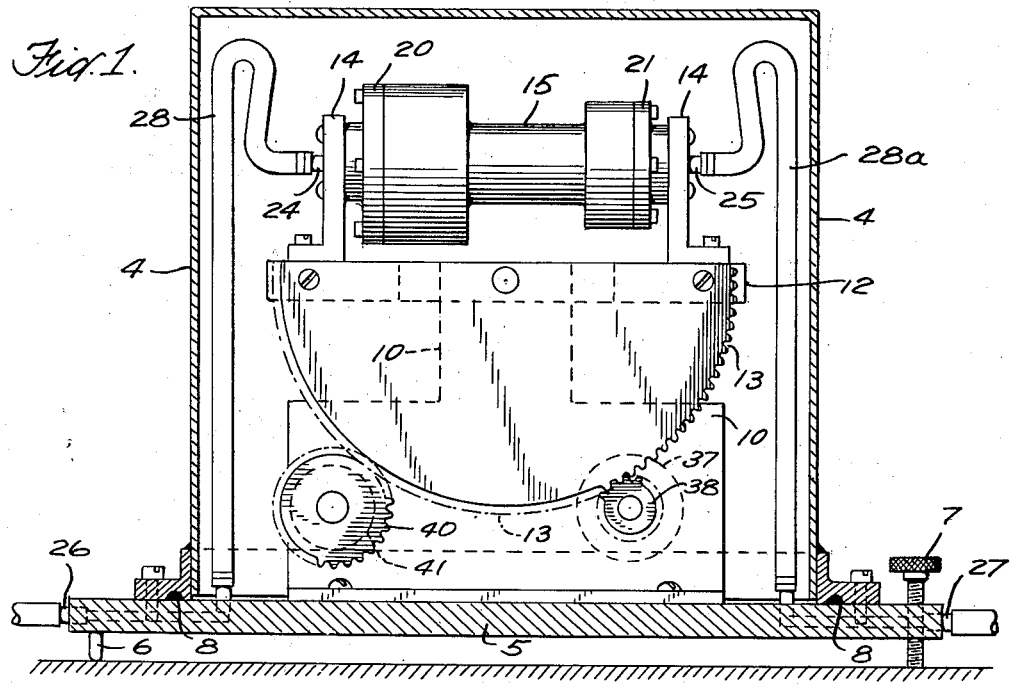
Figure 2:
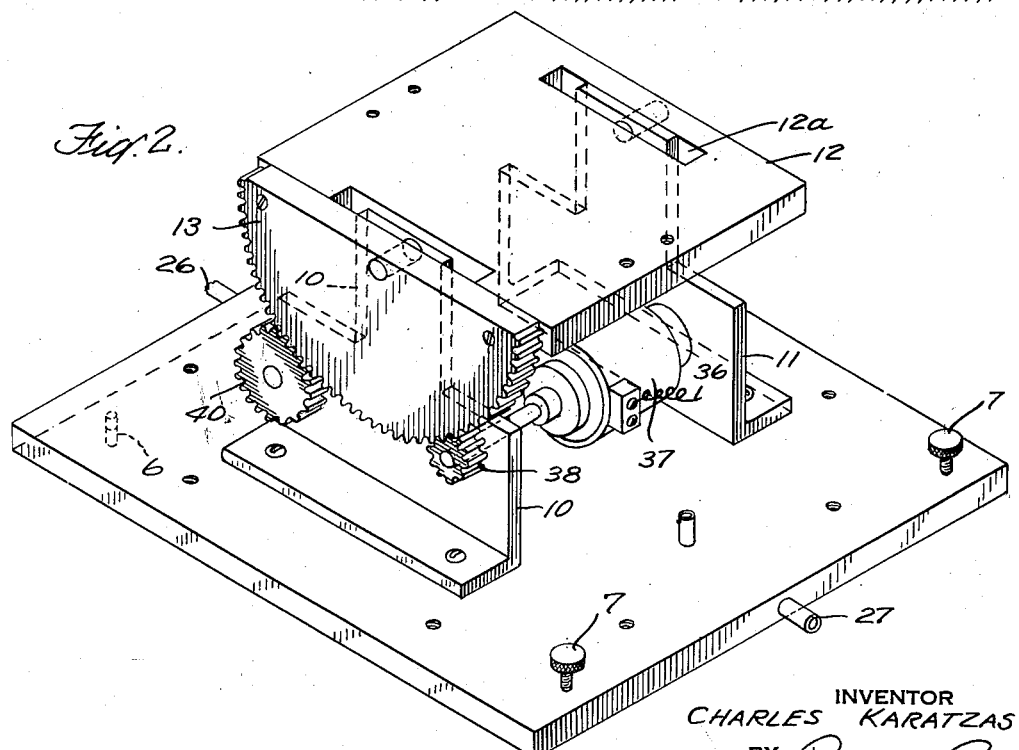

Other objects and advantages of the invention may be appreciated on reading the following description of one embodiment thereof which is taken in conjunction with the following drawings, in which FIG. 1 is a longitudinal section of the high accuracy pressure transducer, FIG. 2 is a perspective of a part of the transducer with the pressure responsive components removed, FIG. 3 is a longitudinal section on an enlarged scale through the sleeve which houses the pressure responsive body, FIG. 4 is a schematic of the transducer, and FIG. 5 is a modified embodiment of invention.

Referring to the drawings, a housing 4 is supported on a base plate 5 which is provided with feet 6 under one end and leveling screw 7 through the other end, only one foot being shown in the drawings. The housing has a circular sealing strip member 8 disposed thereabout where it contacts the base plate to provide a dust proof and partially temperature controlled atmosphere within. A pair of hanger brackets 10 and 11 each having an intermediate upper extension are screwed to the base plate. A top plate 12 for supporting the pressure responsive components is rotatably supported on the hanger bracket 10 by virtue of its screw attachment to segment gear 13 which is in turn rotatably supported by means of a stud shaft through the gear and the upper extension of the bracket and a slot 12a in the top plate on the opposing side thereof receives the upper extension of the hanger bracket 11, a stud shaft connection between the extension and the plate 12 providing the connecting element for the two members.

Screwed to the top surface of the plate are standards 14 which support the pressure responsive components. As shown in FIG. 3, these components comprise a sleeve 15 within which is disposed a solid cylindrical body 16. A stator coil 17 is mounted concentrically about the stator ring 16a disposed on the left end of the cylindrical body 16, which serves as a translatable rotor, being supported in the enlarged left hand end of the sleeve. End plates 20 and 21 cover the two open ends of the sleeve having a sealed connection therewith and there are mounted on the inside surfaces of the end plates 20 and 21 pick off coils 22 and 23 concentric of the cylindrical body and of sufficient diameter to receive the ends of the body. Gas inlet members 24 and 25 are provided in apertures formed in the end plates 20 and 21, respectively. Metering orifices 26 and 27 separately communicate with the inlet members by means of flexible tubes 28 and 28a, respectively.

The pick off coils 22 and 23 acting in conjunction with the stator ring 16a and split ring 23a mounted on the end of the body 16 are adapted to supply current to a stabilization network 29 on displacement of the cylindrical body 16. The current is generated in the coils 22 and 23 when they are caused to cut lines of force emanating from the rings 16a and 23a disposed on the rotating body 16 which is also made to translate with a perceptible velocity due to a fluid pressure differential being exerted on the ends thereof. To this end the body 16 and its terminal rings are fabricated of saturable material. The stabilization network 29 common in the servo art is connected to the pick off coils by conductors 30 and 31, the coils being series connected by conductor 32. The stabilization network is in turn connected to servo amplifier 33 by means of conductors 34 and 35 and the servo signal on amplifier output conductor 36 is used to control servo motor 37. See FIG. 4.

The segment gear 13 is driven by gear 38 mounted on the armature shaft of the servo motor. Also engaging the segment gear on the other side of its axis is angle resolver gear 40 which is mounted on the rotor shaft of angle transducer or resolver 41 which measures the angle through which the gear is driven in rotation by the servo network in order to place the gas supported cylindrical body in gravity equilibrium with the gas pressures applied thereto.

The pressure transducer actually is designed to measure the pressure differential, $P_1 - P_2$, where $P_1$ is applied to the left hand end of the cylindrical body and $P_2$ is applied to the right hand end thereof. It has been found that when the body is in equilibrium the sine of the tilt angle, $\theta$, taken with respect to the true horizontal, see FIG. 4, is proportional to the pressure difference, as expressed by the relationship:

$$(P_1 - P_2)A = W \sin \theta \tag{1}$$

where W is the weight of the cylindrical body and A its cross sectional area. The cylindrical body 16 is rotated as a rotor under the influence of the field produced by the stator coil 17. Its rotation is in an air bearing dynamically established as a consequence of the rotation in the sleeve 15. This self-generated hydrodynamic bearing provides an extremely low friction support with virtually no dry friction. The entire restraint will be viscous and, therefore, an extremely small axial force on the rotating mass will be capable of inducing a linear velocity which, after some interval of time, will build up enough signal to activate the servo until an equilibrium position is reached. The radial clearance between the rotating cylinder and the sleeve will be of the order of magnitude of .000075 inch. The viscous flow through such a clearance is so small that it will not eppreciably affect the pressure difference being measured.

Before the device can be used to measure pressure it must first be leveled. As indicated above, the tilt angle $\theta$ is measured with respect to the true horizontal which is derived from the gravity vector. While it would be practical to effect the leveling by using leveling screws and a sensitive spirit level which could be arranged to yield leveling accuracy of 2 to 5 seconds of arc, it is preferred to use the gas supported rotating body itself to adjust the level. With no pressure difference across the body's mass, the system will automatically settle in the level position at which point the angle resolver or transducer could be nulled or calibrated for zero. This has the advantage of eliminating additional equipment. It is, of course, necessary to mount the transducer on a sufficiently stable base such that once leveled the reference angle of the base will remain virtually unchanged during operation.

In operation, then, the stator coil 17 is energized and the rotating cylinder 16 becomes airborne by virtue of the hydrodynamic action of the air bearing. The servo system is energized with both pressure inlets open to atmospheric pressure. The stator coil is then deenergized in order to eliminate magnetic restraints on the rotating cylinder which will continue to rotate and the angle resolver is nulled or zeroed after the system has settled to a substantially level position. The pressures to be measured, $P_1$ and $P_2$, are applied to each inlet. If one is greater than the other, it will drive the rotating cylinder axially. This will cause the pick off coils to generate a displacement signal for the stabilization network which is amplified and fed to the servo motor 37 to drive the segment gear and tilt the air bearing supporting plate 12 to an angle at which the differential pressure will cause the translatable cylinder to be in equilibrium. The equilibrium position to which the servo will settle is determined by the relationship:

$$(P_2 - P_1) = \frac{W}{A} \sin \theta \qquad (2)$$

Accordingly, the angle resolver or transducer is read and interpreted in terms of the pressure difference. Interpretation of the angle in terms of its sine may be eliminated if the resolver is arranged so that it reads $\sin \theta$ directly which will then linearize the output.

As shown in FIG. 5, there is illustrated a pressure transducer device which does not require a gimbal for operation. The means for introducing pressures $P_1$ and $P_2$ on each side of the cylindrical mass 16b within the sleeve is precisely the same and is, accordingly, not illustrated except as to where the gas under pressure are admitted to the two sides of the sleeve. A linear force motor is mounted on the body of the sleeve intermediate its two ends and is supplied a current by the pick off 23 through stabilization network 29 and the servo amplifier to cause the motor to impart a restraining force to the mass sufficient to place it in linear or axial equilibrium. The current through the motor which is required to effect equilibrium will then be a linear measure of pressure difference $P_2 - P_1$. Of course, the device must be initially leveled as by nulling the pick off or leveling the base for the sleeve prior to admission of the gas pressures.

Various modifications of the embodiment of invention described above may be effected by persons skilled in the art without departing from the scope and principle of invention as defined in the appended claims.

What is claimed is:

1. A pressure transducer comprising a sleeve, a translatable mass disposed in said sleeve, means for rotating said mass so as to effect an air cushion support therefor in said sleeve, there being gas inlet openings at each end of said sleeve, a tube communicating with each of said openings and adapted to receive gas under pressure, means for detecting any axial translation of said mass as a consequence of the pressures applied to the ends thereof and for developing a gravitational force on said mass counter to the force causing its axial translation so as to place the mass in axial equilibrium.

2. A pressure transducer comprising a sleeve, a translatable mass disposed in said sleeve, means for rotating said mass so as to effect an air cushion support therefor in said sleeve, there being gas inlet openings at each end of said sleeve, a flexible tube communicating with each of said openings and adapted to receive gas under pressure, a tiltable plate supporting said sleeve, means for rotatably supporting said plate, a segment gear connected to the plate for rotating the plate and thereby tilting the sleeve on an axis which is non vertical and intersects the longitudinal axis of said sleeve, means for detecting any axial translation of said mass as a consequence of the pressures applied to the ends thereof and a servo network driving said gear and responsive to said detecting means whereby on translation of said mass, said sleeve will be rotated until said mass is in physical equilibrium.

3. A pressure transducer comprising a sleeve, a translatable mass disposed in said sleeve, means for rotating said mass so as to effect an air cushion support therefor in said sleeve, there being gas inlet openings at each end of said sleeve, a flexible tube communicating with each of said openings and adapted to receive gas under pressure, a tiltable plate supporting said sleeve, means for rotatably supporting said plate, a segment gear connected to the plate for rotating the plate and thereby tilting the sleeve on an axis which is non vertical and intersects the longitudinal axis of said sleeve, a pick off coil mounted on each end of said sleeve for detecting axial translation of said mass as a consequence of the pressures applied to the ends thereof, a stabilization network connected to said pickup coils, a servo amplifier driven by said network and a servo motor actuated by said amplifier and in driving engagement with said segment gear whereby on translation of said mass, the gear will be driven by said servo motor until the mass disposed in said sleeve is in physical equilibrium.

4. A pressure transducer as defined in claim 1 wherein the means for developing the counter force on said mass includes a linear force motor mounted on said sleeve and controlled by said detecting means.

References Cited in the file of this patent

UNITED STATES PATENTS

| | | |
|---|---|---|
| 1,512,805 | Roucka | Oct. 21, 1924 |
| 2,072,912 | Hydekampf | Mar. 9, 1937 |
| 2,511,752 | Tandler et al. | June 13, 1950 |